United States Patent
Caubet et al.

(10) Patent No.: US 10,895,443 B2
(45) Date of Patent: Jan. 19, 2021

(54) MORE COMPACT SIDE FORCE STEERING AND ATTITUDE CONTROL SYSTEM, AND A VEHICLE INCLUDING SUCH A SYSTEM

(71) Applicant: ARIANEGROUP SAS, Paris (FR)

(72) Inventors: Pascal Caubet, Saint Medard en Jalles (FR); Matthieu Clermont, Saumos (FR)

(73) Assignee: ARIANEGROUP SAS, Paris (FR)

( * ) Notice: Subject to any disclaimer, the term of this patent is extended or adjusted under 35 U.S.C. 154(b) by 359 days.

(21) Appl. No.: 15/771,715

(22) PCT Filed: Oct. 27, 2016

(86) PCT No.: PCT/FR2016/052801
§ 371 (c)(1),
(2) Date: Apr. 27, 2018

(87) PCT Pub. No.: WO2017/072457
PCT Pub. Date: May 4, 2017

(65) Prior Publication Data
US 2018/0347957 A1    Dec. 6, 2018

(30) Foreign Application Priority Data
Oct. 28, 2015 (FR) ..................... 15 02275

(51) Int. Cl.
*F42B 10/66* (2006.01)
*B64G 1/40* (2006.01)
(Continued)

(52) U.S. Cl.
CPC .............. *F42B 10/663* (2013.01); *B64G 1/26* (2013.01); *B64G 1/403* (2013.01); *B64G 1/62* (2013.01)

(58) Field of Classification Search
CPC ........ F42B 10/663; B64G 1/403; B64G 1/402; B64G 1/40; B64G 1/26; B64G 1/62
See application file for complete search history.

(56) References Cited

U.S. PATENT DOCUMENTS

| 3,167,912 A | 2/1965 | Ledwith | |
|---|---|---|---|
| 5,755,401 A * | 5/1998 | Frey | ...................... F42B 10/663 137/375 |

(Continued)

FOREIGN PATENT DOCUMENTS

JP    H09-72700 A    3/1997

OTHER PUBLICATIONS

International Search Report as issued in International Patent Application No. PCT/FR2016/052801, dated Feb. 22, 2017.

*Primary Examiner* — Matthew M Barker
(74) *Attorney, Agent, or Firm* — Pillsbury Winthrop Shaw Pittman LLP (57) ABSTRACT

An in-flight side force steering and attitude control system for a vehicle includes a thruster body and a plurality of valves distributed in first and second valve sets. The system further includes a first tank defined by a first cylindrical enclosure present at the center of the thruster body, the first tank containing a first solid propellant charge having at least one combustion face exposed at one end of the first tank, the first tank being in communication with the first valve set; and a second tank defined between the first cylindrical enclosure and a second cylindrical enclosure present around the first enclosure, the second tank containing a second solid propellant charge having at least one combustion face exposed at one end of the second tank, the second tank being in communication with the second valve set.

10 Claims, 7 Drawing Sheets

(51) Int. Cl.
    *B64G 1/26*           (2006.01)
    *B64G 1/62*           (2006.01)

(56) References Cited

U.S. PATENT DOCUMENTS

| | | |
|---|---|---|
| 7,102,113 B2 | 9/2006 | Fujita et al. |
| 8,464,640 B2 * | 6/2013 | Sawka .................... C06B 45/00 |
| | | 102/202 |
| 9,365,300 B2 * | 6/2016 | Fujita ..................... B64G 1/244 |
| 9,469,419 B2 * | 10/2016 | Fujita ....................... B64G 1/26 |
| 9,696,726 B2 * | 7/2017 | Fujita ..................... B64G 1/244 |
| 2004/0245371 A1 | 12/2004 | Fujita et al. |
| 2005/0115439 A1 * | 6/2005 | Abel ......................... F02K 9/24 |
| | | 102/288 |
| 2013/0014491 A1 | 1/2013 | Suzuki et al. |
| 2014/0109552 A1 | 4/2014 | Caubet et al. |
| 2014/0145038 A1 | 5/2014 | Fujita et al. |

* cited by examiner

MORE COMPACT SIDE FORCE STEERING AND ATTITUDE CONTROL SYSTEM, AND A VEHICLE INCLUDING SUCH A SYSTEM

CROSS-REFERENCE TO RELATED APPLICATIONS

This application is the U.S. National Stage of PCT/FR2016/052801, filed Oct. 27, 2016, which in turn claims priority to French patent application number 15/02275, filed Oct. 28, 2015. The content of these applications are incorporated herein by reference in their entireties.

BACKGROUND OF THE INVENTION

The invention relates to a side force steering and attitude control system for a vehicle, also known as a "divert and attitude control system" (DACS).

The invention is particularly applicable to the top portions, or terminal portions, of interceptor missiles used for antiballistic missile defense, in order to maintain a desired path and attitude at mission end. Nevertheless, the invention can be used for other types of air or space vehicle, e.g. for anti-aircraft defense missiles, for air-to-air missiles, for atmospheric reentry vehicles, or indeed for space exploration modules.

Figure 1:
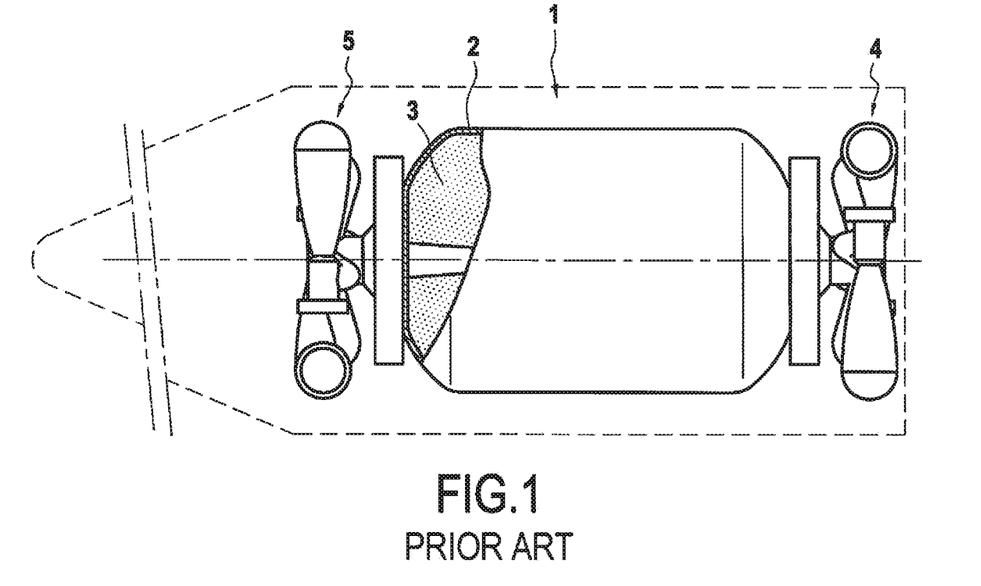
FIG. 1, described above, is a highly diagrammatic view of an interceptor missile terminal portion fitted with a prior art DACS.

A known DACS for a vehicle constituting the terminal portion of an interceptor missile is shown very diagrammatically in FIG. 1. That DACS 1, which is disclosed in Document US 2014/0109552, comprises a thruster body 2 containing a block of solid propellant 3, a first set 4 of attitude correction valves (or attitude correction system (ACS)) situated at the rear of the thruster body 2, and a second set 5 of side force steering or trajectory divert valves situated at the front of the thruster body 2. In that DACS, the first and second valve sets 4 and 5 are powered using the same block of solid propellant 3, which means that it is not possible to decouple thrust control between attitude correction and side force steering of the vehicle.

Document U.S. Pat. No. 7,102,113 discloses a DACS in which the first and second valve sets dedicated respectively to attitude control and to side force steering are fed with gas independently by distinct propellant blocks. Nevertheless, that independent combustion chamber architecture leads to an increase in the overall size of the DACS in the vehicle.

There thus exists a need for a DACS having an independent combustion chamber that presents smaller overall size.

OBJECT AND SUMMARY OF THE INVENTION

To this end, the present invention provides an in-flight side force steering and attitude control system for a vehicle, the system comprising a thruster body and a plurality of valves distributed in first and second valve sets, and being characterized in that it further comprises:

a first tank forming a first combustion chamber, the first tank being defined by a first substantially cylindrical enclosure present at the center of the thruster body and extending along a longitudinal axis of said thruster body, the first tank being closed at a first end and open at a second end, the first tank containing a first solid propellant charge having at least one combustion face exposed at the second end of said first tank, the first tank being in communication with the first valve set; and a second tank forming a second combustion chamber, the second tank being defined between the first substantially cylindrical enclosure and a second substantially cylindrical enclosure present around said first enclosure and extending along the longitudinal axis of the thruster body, the second tank being closed at a first end and open at a second end, the second tank containing a second solid propellant charge having at least one combustion face exposed at the second end of said second tank, the second tank being in communication with the second valve set.

Compared with the above-described prior art DACS systems, the system of the invention with two solid propellant tanks engaged one within the other is advantageous in that it makes it possible to feed the attitude correction module or system (ACS) with gas completely independently from the side force steering or trajectory divert module, while making it possible to obtain a DACS that is very compact.

Independence between the first and second tanks enables the operating points (pressure, combustion duration, ignition instants, etc.) of the ACS and divert modules to be better optimized in that the first and second valve sets constituting respectively an ACS module and a divert module or vice versa can be fed with solid propellant charges that differ in their structures and their natures.

The architecture involving one tank within the other also serves to reduce the inert mass of the engine. In addition, the use of front burning solid propellant charges serves to reduce the mass of unburnt material.

The substantially cylindrical shape of the first tank and the annular shape of the second tank simplify making the solid propellant block(s) for use in each of the tanks, while enabling constant variation in combustion area, thus making it easier to obtain balanced flow rate/thrust throughout a mission, thereby simplifying control of the DACS.

Preferably, the first and second valve sets are arranged at a distance apart respectively towards the front and towards the rear of the thruster body in substantially symmetrical manner relative to the center of gravity of the vehicle situated on the longitudinal axis of the thruster body.

According to a particular characteristic of the DACS of the invention, the second end of the first tank through which the combustion face of the first propellant charge is exposed, and the second end of the second tank through which the combustion face of the second propellant charge is exposed, are arranged at a distance apart from each other, respectively towards the rear and towards the front of the thruster body, in a manner that is substantially symmetrical relative to the center of gravity of the vehicle situated on the longitudinal axis of the thruster body. In this configuration, the first and second solid propellant charges burn in opposite directions, thereby serving to limit variations in the position of the center of gravity while the system is in operation.

According to another particular characteristic of the DACS of the invention, the first solid propellant charge may present a combustion speed different from the combustion speed of the second solid propellant charge. It is thus possible under such circumstances to have different pressures in the first and second tanks and consequently to have appropriate different thrusts for each of the divert and ACS modules, and also optimization of the mass of the overall system.

Preferably, the surfaces of the first and second solid propellant charges other than their surfaces corresponding to the combustion faces are covered in a layer of inhibitor material.

According to another particular characteristic of the DACS of the invention, the first solid propellant charge comprises a plurality of solid propellant segments, the segments being separated from one another by layers of inhibitor material. As an alternative or in addition, the second solid propellant charge may comprise a plurality of solid propellant segments, the segments being separated from one another by layers of inhibitor material. It is thus possible to enable the divert module and/or the ACS module to operate in pulsed mode.

According to yet another particular characteristic of the DACS of the invention, the first tank is in communication with the first valve set via an extender. This increases the lever arm in operation of the valves of the first set of valves.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 2:
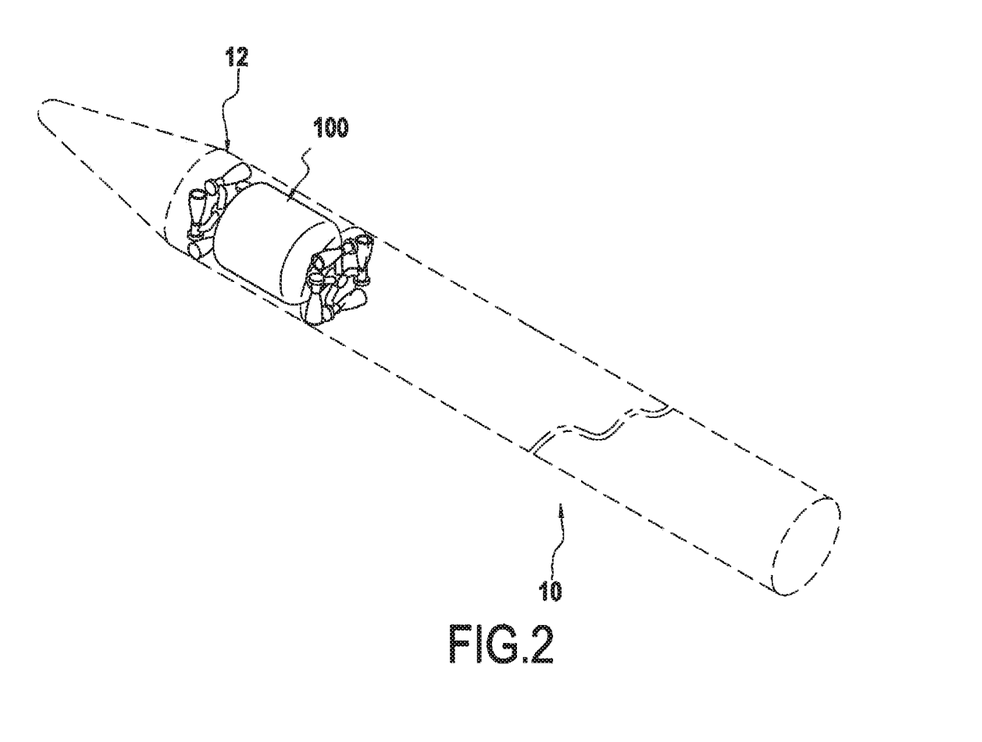
FIG. 2 is a highly diagrammatic view of an interceptor missile having a terminal portion fitted with a DACS in an embodiment of the invention.

FIG. 2 is a highly diagrammatic view of an interceptor missile 10 for antiballistic missile defense and having a top or terminal portion 12 fitted with a DACS 100 for steering the terminal portion 12 by optionally diverting its trajectory and optionally correcting its attitude at mission end, after separation from the remainder of the missile.

The DACS 100 (FIGS. 3 to 7) comprises a thruster body 120 having a first tank 130 defined by a first substantially cylindrical enclosure 131 present at the center of the thruster body 120 and extending along a longitudinal axis A of the thruster body. The first tank 130 is closed at its front end by an end wall 132 and it is open at its rear end 130a. The terms "rear" and "front" are used with reference to the travel direction of the terminal portion 12. The first tank 130 contains a first charge of solid propellant 140 having a combustion face 141a exposed at the rear end of the first tank 130. The combustion face 141a extends in a direction perpendicular to the longitudinal axis A.

The thruster body 120 also has a second tank 150 defined between the first substantially cylindrical enclosure 131 and a second substantially cylindrical enclosure 151 present around the first cylindrical enclosure 131 and extending along the longitudinal axis A of the thruster body, the enclosures 131 and 151 in this example being coaxial. The second tank 150 is closed at its rear end by an end wall 152 constituting the rear end wall of the thruster body 120, and it is open at its front end 150a. The second tank 150 contains a second charge of solid propellant 160 having a combustion face 161a exposed at the front end 150a of the second tank 150. The combustion face 161a extends in a direction perpendicular to the longitudinal axis A.

Figure 4:
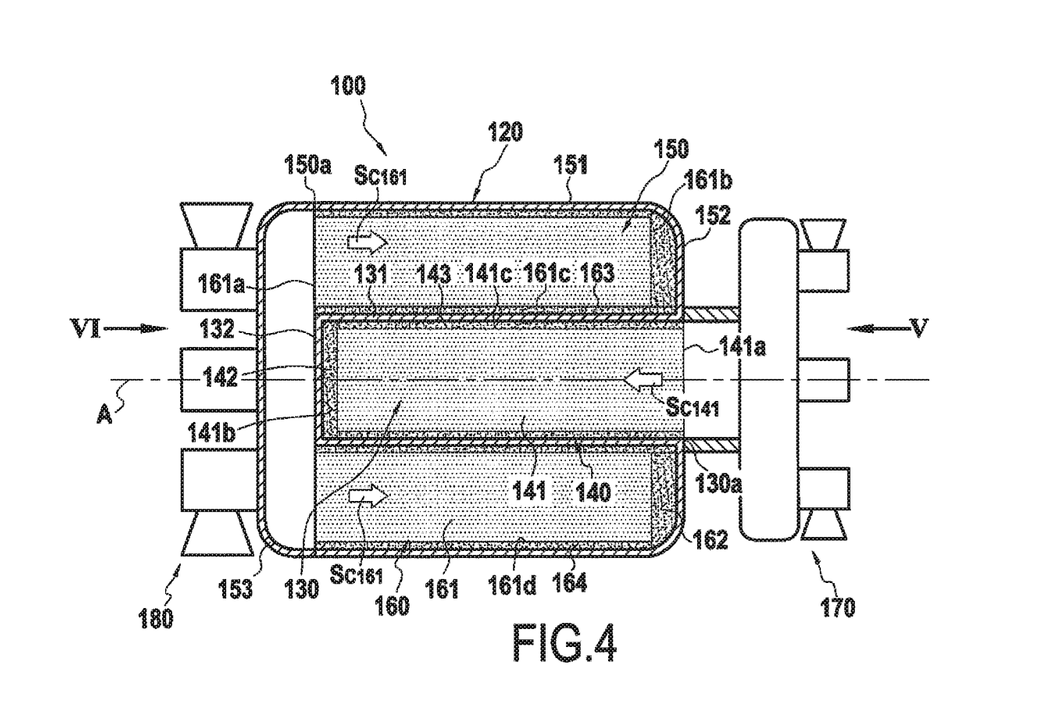
Figure 7:
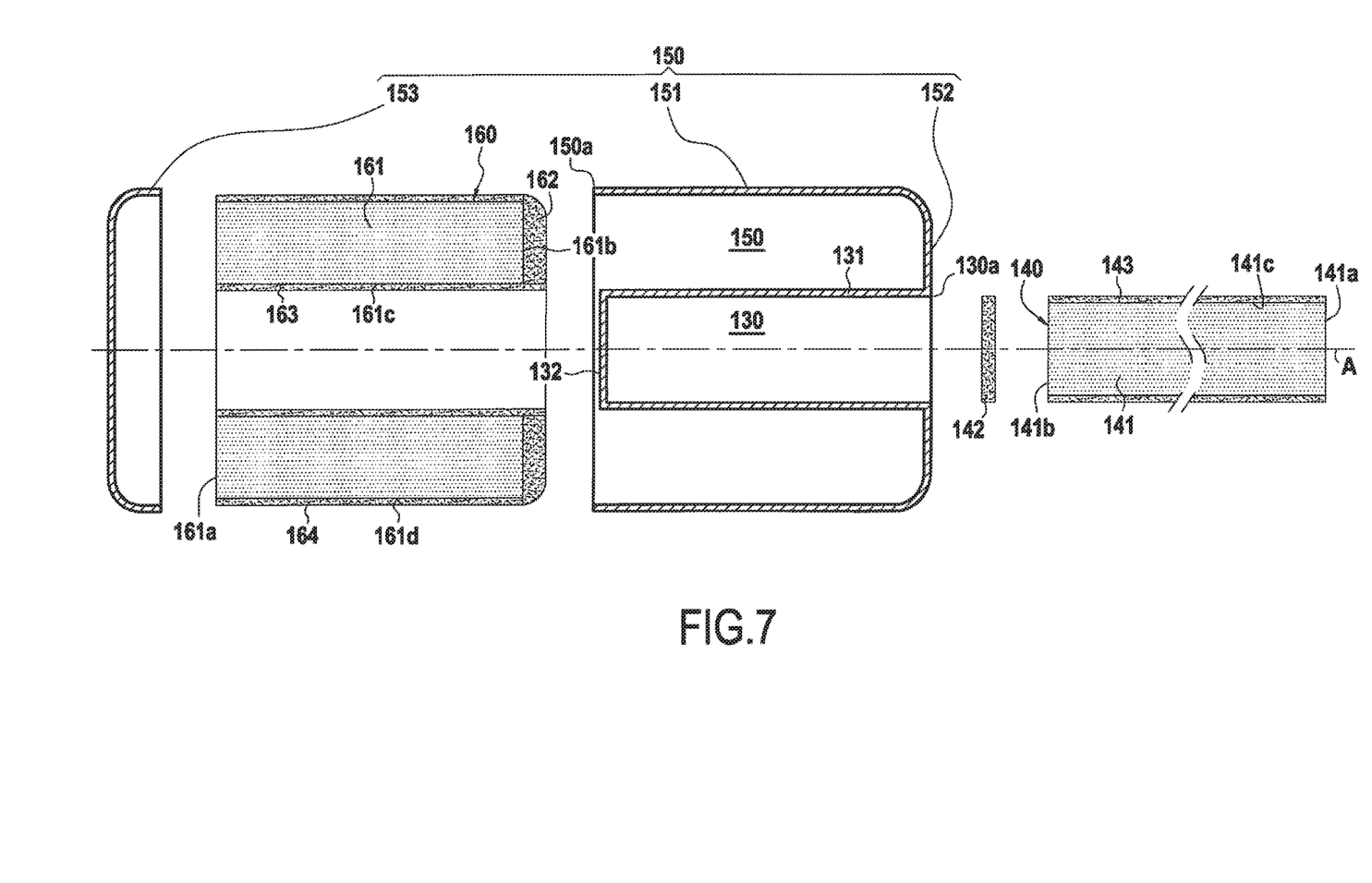

In this example, the thruster body 120 is formed by the second substantially cylindrical enclosure 151, which is closed at its downstream portion by the rear end wall 152 and at its upstream portion by an end wall 153 constituting the front end wall of the thruster body 120 (FIGS. 4 and 7).

The DACS 100 also comprises a first set 170 of valves situated at the rear of the thruster body 120 and a second set 180 of valves situated at the front of the thruster body 120. The valves of the first set 170 of valves are in communication with the first tank 130, while the valves of the second set 180 of valves are in communication with the second tank 150. The DACS has an electronic control device (not shown) enabling the opening and closing of the valves in the first and second sets of valves to be controlled selectively by means of actuators (not shown).

The first solid propellant charge 140 is of the front combustion block type. For this purpose, in the presently-described example, it is constituted by a single solid propellant block 141 of cylindrical shape and having its surfaces other than the combustion face 141a covered in an inhibitor material. More precisely, the face 141b of the block 141 opposite from its face 141a is covered in a layer of inhibitor material 142, while the outside surface 141c of the block facing the inside surface of the first cylindrical enclosure 131 is covered in an layer of inhibitor material 143. The layers of inhibitor material 142 and 143 may be made independently of each other and fitted on the solid propellant block 141, or they may form part of a single-piece structure made of inhibitor material, with the solid propellant block 141 then being inserted inside the single-piece structure. A first ignition system (not shown) is present in order to initiate combustion of the solid propellant block 141 from its combustion face 141a.

The second solid propellant charge 160 is of the front combustion block type. For this purpose, in the presently-described example, it is constituted by a single solid propellant block 161 of annular shape having its surfaces other than its combustion face 161a covered in inhibitor material. More precisely, the face 161b of the block 161 opposite from its face 161a is covered in a layer of inhibitor material 162, while the inside and outside surfaces 161c and 161d of the block 161 respectively facing the outside surface of the first substantially cylindrical enclosure 131 and the inside surface of the second substantially cylindrical surface 151 are respectively covered in a layer 163 of inhibitor material and a layer 164 of inhibitor material. The inhibitor material layers 162, 163, and 164 may be made independently of each other and fitted onto the solid propellant block 161, or they may form parts of a single-piece structure made of inhibitor material, with the solid propellant block 161 then being inserted inside the single piece structure. A second ignition system (not shown) is present in order to initiate combustion of the solid propellant block 161 from its combustion face 161a.

The first and second tanks 130 and 150 form first and second combustion chambers feeding gas independently to the first and second valve sets 170 and 180 respectively.

Figure 5:
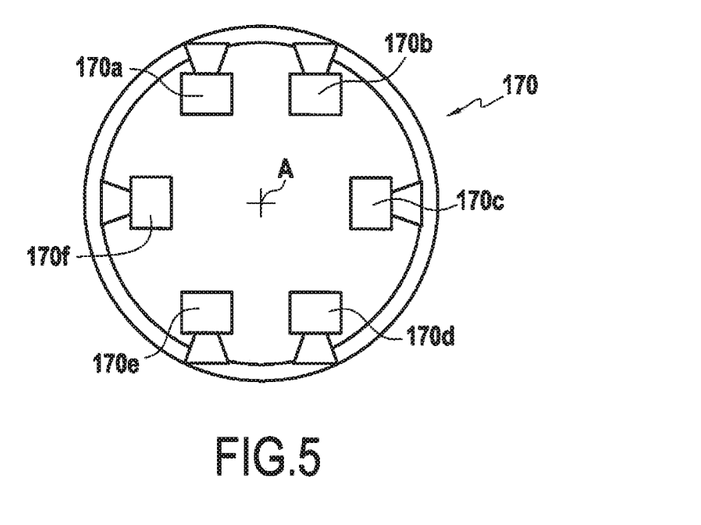

More precisely, in the presently-described example, the first valve set 170 corresponds to the attitude correction module for system (ACS) and comprises six valves 170a, 170b, 170c, 170d, 170e, and 170f that are mounted directly on the end wall 152 constituting the rear end wall of the thruster body 120. The first valve set 170 has a first pair of valves 170a and 170b facing in a first direction that is substantially perpendicular to that axis A, a second pair of valves 170*d* and 170*e* facing in a second direction opposite to the first direction, and two other valves 170*c* and 170*f* facing in mutually opposite directions that are substantially perpendicular both to the axis A and to the first and second directions. A control device (not shown) comprising control electronics and actuators is provided for selectively controlling the opening of one or more valves 170*a*, 170*b*, 170*c*, 170*e*, 170*e*, and 170*f* when an attitude correction is required (yaw, roll, and/or pitching correction). The solid propellant block 141 is used for feeding the valves 170*a*, 170*b*, 170*c*, 170*d*, 170*e*, and 170*f*.

Figure 6:
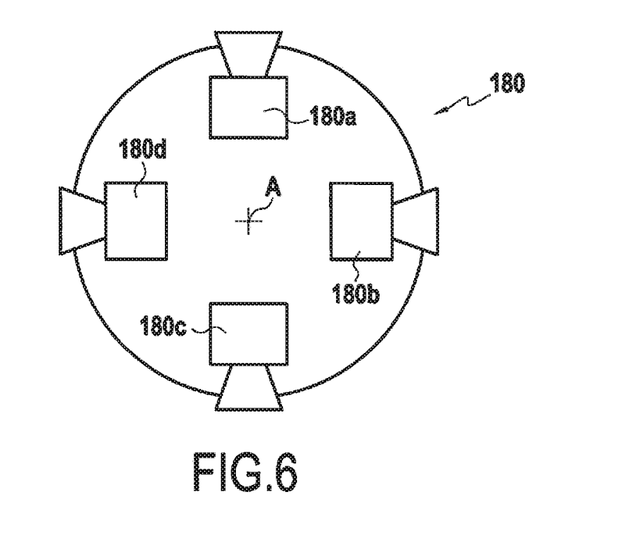

Still in the presently-described example, the second set 180 of valves corresponds to the side force steering or trajectory divert module and it comprises four valves 180*a*, 180*b*, 180*c*, and 180*d* that are directly mounted on the end wall 153 constituting the front end wall of the thruster body 120. The vales 180*a*, 180*b*, 180*c*, and 180*d* are regularly arranged around the axis A of the vehicle 10, substantially at its center of gravity, so as to generate lateral thrusts perpendicularly to the axis A, without significant disturbance to the attitude of the vehicle 10. A control device (not shown) comprising control electronics and actuators is provided to control selectively the opening of one or more of the valves 180*a*, 180*b*, 180*c*, and 180*d* when it is required to divert the trajectory. The solid propellant block 161 is used solely for feeding the valves 180*a*, 180*b*, 180*c*, and 180*d*.

Figure 3:
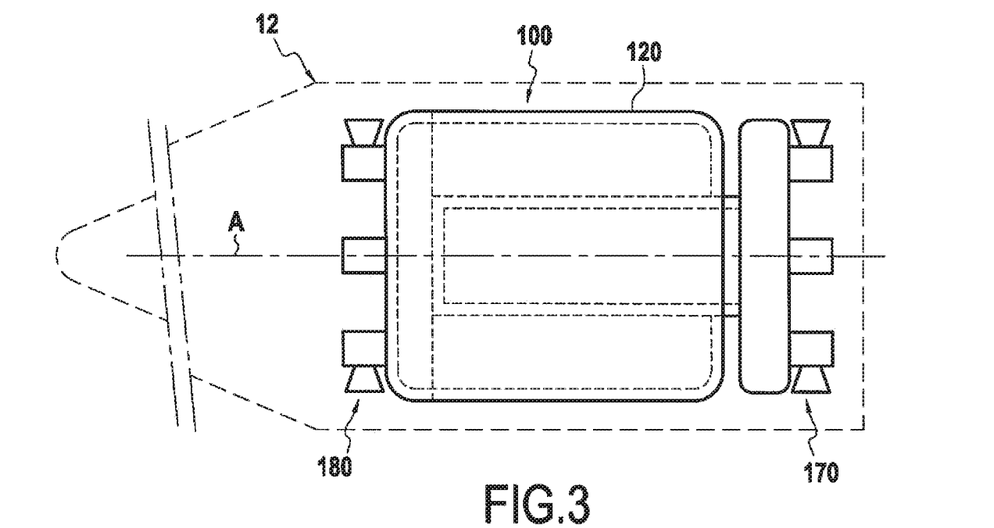
FIGS. 3 to 7 show the terminal portion of the FIG. 2 missile on a larger scale, respectively in side view, in section view, in rear view, in front view, and in exploded view.

In the example shown, the first and second valve sets 170 and 180 are arranged symmetrically relative to the center of gravity of the terminal portion 12 as a whole, where the center of gravity is situated on the axis A. The payload and the various pieces of equipment of the terminal portion 12 are preferably arranged so that the position of the center of gravity remains substantially unchanged during combustion of the propellant.

The first and second valve sets 170 and 180 are situated at a distance apart along the axis A in order to be able to generate lateral thrusts with appropriate force moments, in particular in the event of making a pitching or yaw correction. Advantageously, the valves 170*a*, 170*b*, 170*c*, 170*d*, 170*e*, 170*f*, 180*a*, 180*b*, 180*c*, and 180*d* are all identical, thereby simplifying definition and provision of the DACS. Such simplification also results from mounting the valves outside the thruster body 120, with such mounting also providing good pyrotechnic safety. Also advantageously, but not necessarily, the thrust axes of all of the valves are situated at the same distance from the axis A.

In known manner, the control device (not shown) acts on the actuators (not shown) respectively associated with the various valves of the first and second valve sets 170 and 180, i.e. acts on the flow section for gas in the pipes connecting the valves to the thruster body, which valves are therefore variable-opening valves that are controlled between fully closed and fully open.

As shown in FIG. 4, the block 141 of the first solid propellant charge 140 burns in a direction indicated by arrow Sc141, while the block 161 of the second solid propellant charge 160 burns in the opposite direction as indicated by an arrows Sc161, thereby serving to limit variation in the center of gravity of the DACS while it is in operation.

Figure 8:
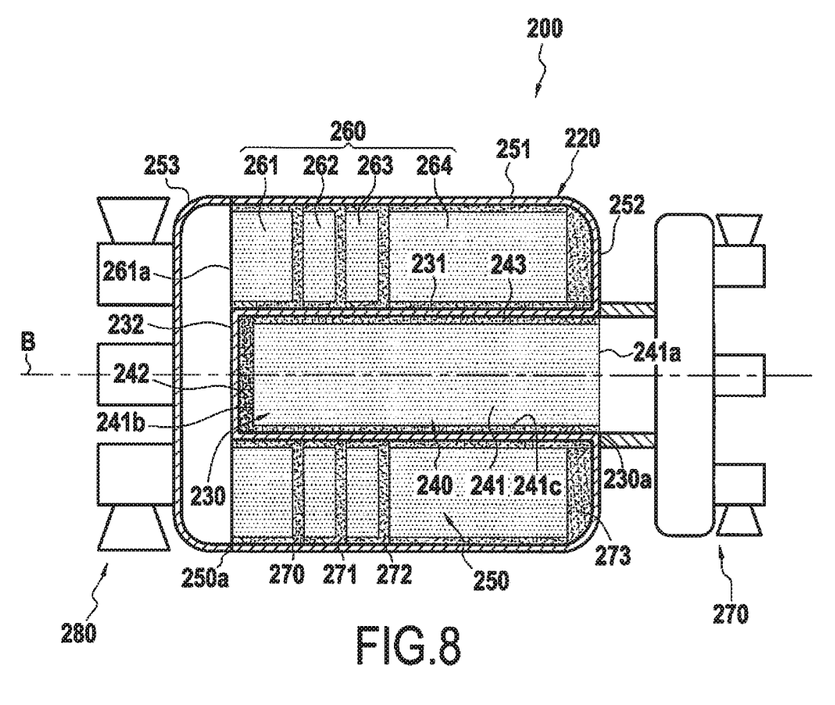
FIGS. 8 and 9 are respectively a section view and an exploded view of a DACS in another embodiment of the invention.
Figure 9:
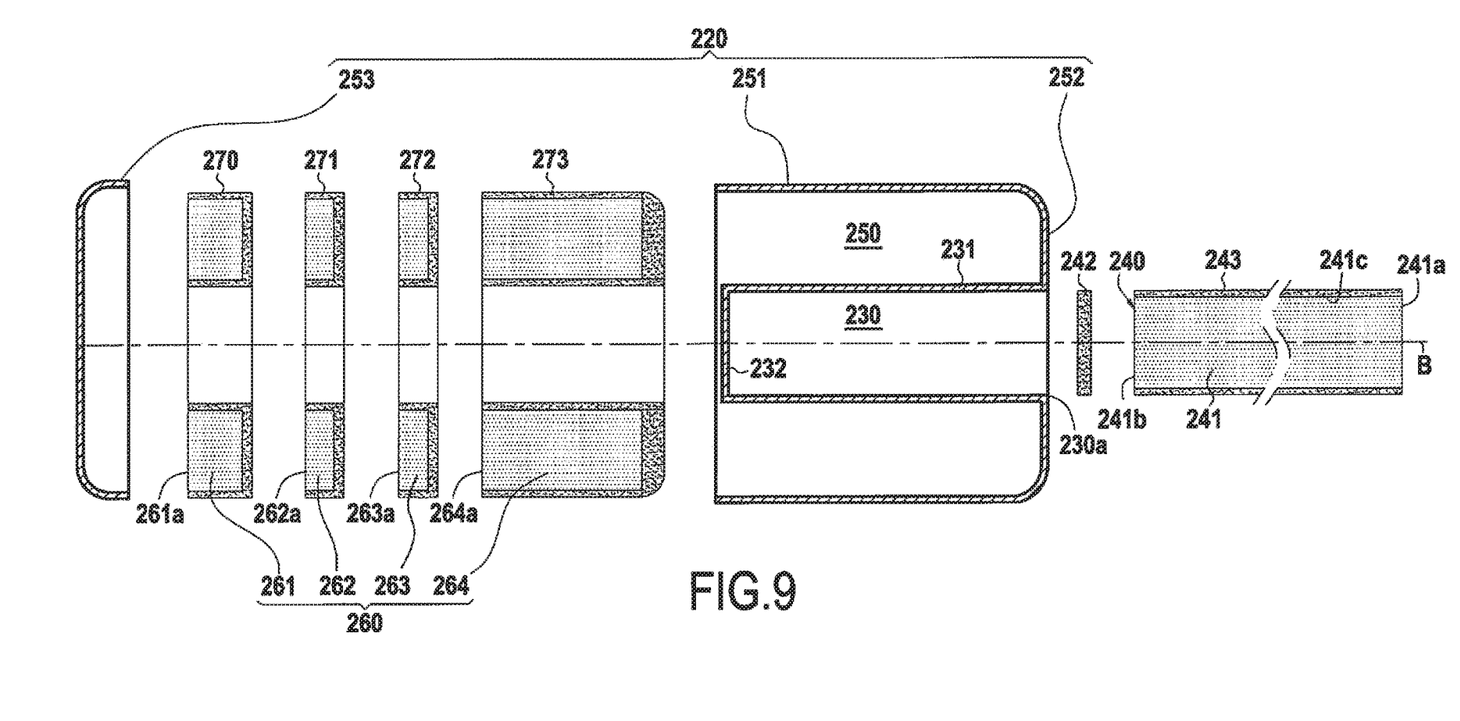

FIGS. 8 and 9 show a DACS 200 that differs from the above-described DACS 100 in that the solid propellant charge for feeding the side force steering or trajectory divert module is segmented into a plurality of solid propellant blocks, enabling this module to operate in pulsed mode. Like the above-described DACS 100, the DACS 200 comprises a thruster body 220 having a first tank 230 defined by a first substantially cylindrical enclosure 231 extending along a longitudinal axis B of the thruster body. The first tank 230 is closed at its front end by an end wall 232 and it is open at its rear end 230*a*. The first tank 230 contains a first solid propellant charge 240 having a combustion face 241*a* that is exposed at the rear end of the first tank 230.

The thruster body 220 also has a second tank 250 defined between the first substantially cylindrical enclosure 231 and a second substantially cylindrical enclosure 251 present around the first enclosure 231 and extending along the longitudinal axis B of the thruster body, the enclosures 231 and 251 being coaxial. The second tank 250 is closed at its rear end by an end wall 252 constituting the rear end wall of the thruster body 220 and it is open at its front end 250*a*. The second tank 250 contains a second solid propellant charge 260.

The thruster body 220 in this example is formed by the second substantially cylindrical enclosure 251, which is closed at its downstream portion by the rear end wall 252, and at its upstream portion by an end wall 253 constituting the front end wall of the thruster body 220.

The DACS 200 also has first and second valve sets 270 and 280 similar to the first and second valve sets 170 and 180 described above with reference to the DACS 100. The valves of the first valve set 270 are in communication with the first tank 230 while the valves of the second valve set 280 are in communication with the second tank 250. The DACS has an electronic control device (not shown) serving to selectively control opening and closing of the valves in the first and second valve sets by means of actuators (not shown).

The first solid propellant charge 240 is of the front combustion block type. For this purpose, in the presently-described example, it is constituted by a single block of solid propellant 241 in the form of a cylinder having its surfaces other than its combustion face 241*a* covered in an inhibitor material. More precisely, the face 241*b* of the block 241 opposite from its face 241*a* is covered in a layer 242 of inhibitor material, while the outside surface 241*c* of the block facing the inside surface of the first substantially cylindrical enclosure 231 is covered in a layer 243 of inhibitor material. A first ignition system (not shown) is present in order to initiate combustion of the solid propellant block 241 from its combustion face 241*a*.

The second solid propellant charge 260 is constituted by a plurality of solid propellant segments 261, 262, 263, and 264, each of which is annular in shape. The solid propellant segments 261, 262, 263, and 264 are of the front combustion block type and they present respective combustion faces 261*a*, 262*a*, 263*a*, and 264*a*. The segment 261 has a combustion face 261*a* exposed at the front end 250*a* of the second tank 250.

The face of the segment 261 opposite from its face 261*a* and the inside and outside surfaces of the segment 261 respectively facing the outer surface of the first substantially cylindrical enclosure 231 and the inside surface of the second substantially cylindrical enclosure 251 are covered in a layer 270 of inhibitor material. The same applies to the segments 262, 263, and 264 in which the faces opposite from their combustion faces and their inside and outside surfaces are respectively covered in layers 271, 272, and 273 of inhibitor material. Individual ignition systems (not shown) are associated with each of the segments 261, 262, 263, and 264 in order to initiate combustion of each propellant segment in individual manner, thereby managing combustion of the charge in pulsed mode.

The first and second tanks 230 and 250 form first and second combustion chambers feeding gas respectively to the first and second valve sets 270 and 280. As described above for the DACS 100, the first valve set 270 corresponds to the attitude correction module or system (ACS) in which the valves are mounted directly on the end wall 252 constituting the rear end wall of the thruster body 220. A control device (not shown) comprising control electronics and actuators is provided for selectively controlling the opening of one or more of the valves of the first set 270 of valves when attitude correction is required (yaw, roll, and/or pitching correction). The solid propellant block 241 is used solely for feeding the valves in the first set 270 of valves.

The second valve set 280 corresponds to the side force steering or trajectory divert module in which the valves are mounted directly on the end wall 253 constituting the front end wall of the thruster body 220. A control device (not shown) comprising control electronics and actuators is provided for selectively controlling the opening of one or more of the valves in the second set 280 of valves when trajectory diversion is required. The solid propellant segments 261, 262, 263, and 264 are burnt in succession in order to feed only the valves of the second valve set 280. As mentioned above, the use of a charge in segmented form makes operation in pulsed mode possible, thus making it possible to feed the valves of the second valve set 280 in a plurality of gas pulses, four in this example. The duration of each gas pulse is defined as a function of the length of each solid propellant segment and/or of the speed of combustion of each segment. In the example described, the four segments 261, 262, 263, and 264 all have the same speed of combustion, the segment 264 of greatest length delivering the longest gas pulse, followed by the segment 261, and then the segments 262 and 263.

Figure 10:
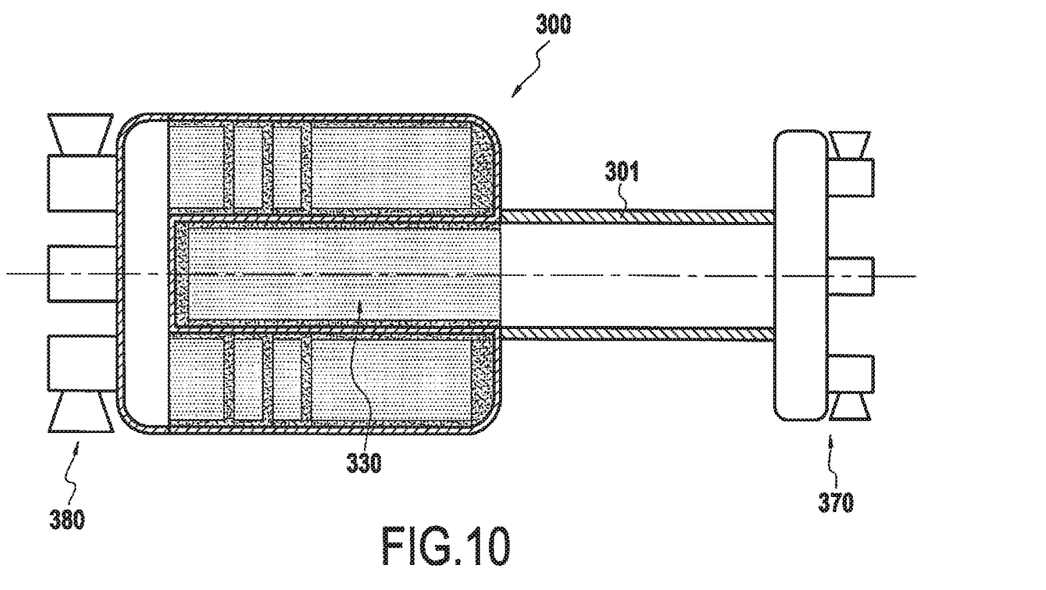
FIG. 10 is a section view of a DACS in another embodiment of the invention.

The first and second valve sets 170 and 180 or 270 and 280 as described above are mounted respectively directly on the rear end wall or on the front end wall of the thruster body 120 or 220. Nevertheless, the first and second valve sets may be fastened on a distributor body made of metal or of composite material, which is itself mounted on the rear end wall or the front end wall of the thruster body. In yet another variant embodiment, shown in FIG. 10, a DACS 300 may further comprise an extender 301 in communication with the first tank 330 and the first valve set 370, thereby serving to increase the lever arm of the attitude correction module or system (ACS) formed by the first valve set 370, a second valve set 380 constituting the side force steering or path divert module having its valves mounted directly on the front end wall of the thruster body. The other portions of the DACS 300 are identical to those described above for the DACS 200, and are not described again for reasons of simplicity.

Figure 11:
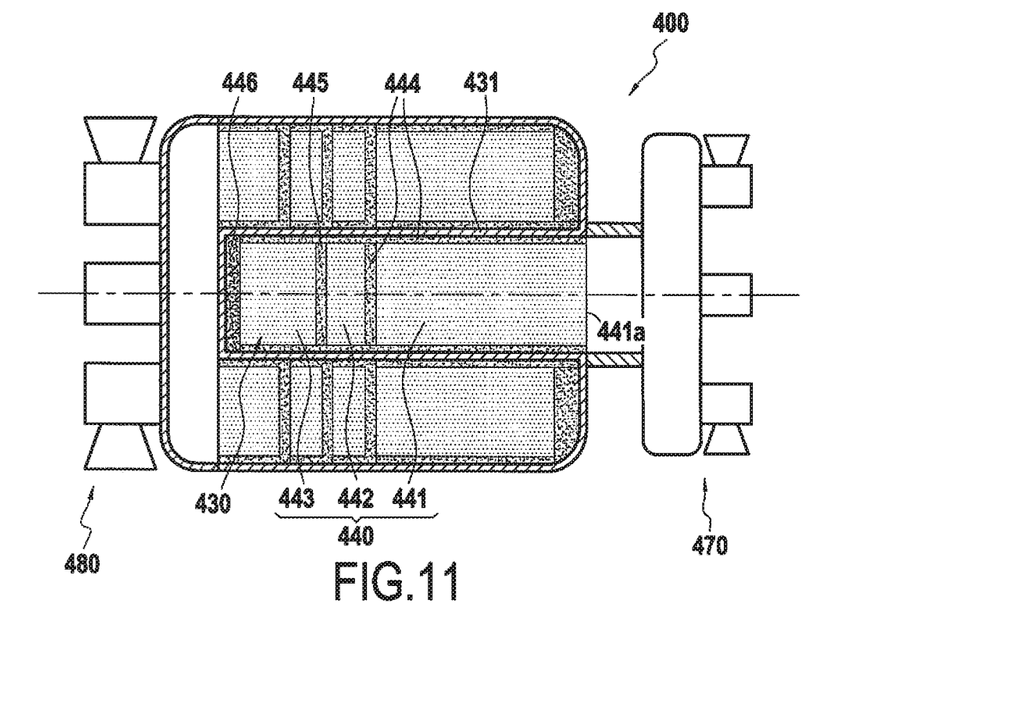
FIG. 11 is a section view of a DACS in another embodiment of the invention.

In addition, the first valve set corresponding to the attitude correction module or system (ACS) may also be fed with gas in pulsed manner, as shown by way of example in FIG. 11, which shows a DACS 400 that differs from the DACS 200 of FIGS. 8 and 9 in that the first solid propellant charge 440 for feeding gas to a first valve set 470 constituting an attitude correction module is segmented into a plurality of solid propellant blocks making operation in pulsed mode possible. FIG. 11 shows a first tank 430, the first valve set 470 and a second valve set 480. The first solid propellant charge 440 is constituted by a plurality of solid propellant segments 441, 442, and 443, each being cylindrical in shape and of the front combustion block type.

The face of the segment 441 opposite from its combustion face 441*a* and the inside and outside surfaces of the segment 441 respectively facing the inside surface of the first cylindrical enclosure 431 are covered in a layer 444 of inhibitor material. The same applies to the segments 442 and 443 for which the faces opposite from the combustion face and the inside surfaces are respectively covered by layers 445 and 446 of inhibitor material. A second ignition system (not shown) is present in order to initiate combustion of the solid propellant segment 441 from the combustion face 441*a*. Individual ignition systems (not shown) are associated with each of the segments 441, 442, and 443 in order to initiate combustion of each propellant segment in individual manner, thereby managing the combustion of the charge in pulsed mode.

The duration of each pulse is defined as a function of the length of each solid propellant segment and/or of the combustion speed of each segment. In the presently-described example, all three segments 441, 442, and 443 have the same combustion speed, with the longest segment 441 delivering the longest gas pulse, followed by the segment 443, and by the segment 442.

The solid propellant segments or blocks constituting the first and second charges of the DACS of the invention may be free, i.e. inserted with radial clearance in the first and second tanks and adhesively bonded by the inhibitor material on the face opposite from their combustion face or they may be cast directly in the tank protected by cellular thermal protection that serves to reduce the mechanical stresses on the blocks or segments and their connections.

The solid propellant used for feeding gas to the attitude correction module or system (ACS) may present combustion different from the solid propellant used for feeding gas to the side force steering or trajectory diversion module so as to have different combustion speeds and consequently different thrusts. By way of example, the solid propellant used for feeding gas to the divert module may present a combustion speed that is two to three times greater than that of the solid propellant used for feeding gas to the ACS module.

In the above-described examples, the first and second valve sets are placed respectively at the two ends of the thruster body. Nevertheless, in the in-flight side force steering and attitude control system of the invention for a vehicle, one of the two valve sets could be placed in an intermediate position on the thruster body. By way of example, the first tank, when full, may be organized as two symmetrical modules and the set of valves corresponding to the side force steering or trajectory divert module may be placed on the thruster body in the vicinity of the center of gravity of the full first tank (the set of valves being secured to a central ring connected to the two symmetrical modules of the first tank).

The invention claimed is:

1. An in-flight side force steering and attitude control system for a vehicle, the system comprising a thruster body and a plurality of valves distributed in first and second valve sets, and comprising:

a first tank defined by a first substantially cylindrical enclosure present at a center of the thruster body and extending along a longitudinal axis of said thruster body, the first tank being closed at a first end and open at a second end, the first tank containing a first solid propellant charge having at least one combustion face exposed at the second end of said first tank, the first tank being in communication with the first valve set; and a second tank defined between the first substantially cylindrical enclosure and a second substantially cylindrical enclosure present around said first substantially cylindrical enclosure and extending along the longitudinal axis of the thruster body, the second tank being closed at a first end and open at a second end, the second tank containing a second solid propellant charge having at least one combustion face exposed at the second end of said second tank, the second tank being in communication with the second valve set.

2. A system according to claim 1, wherein the first and second valve sets are arranged at a distance apart respectively towards the front and towards the rear of the thruster body in substantially symmetrical manner relative to the center of gravity of the vehicle situated on the longitudinal axis of the thruster body.

3. A system according to claim 1, wherein the second end of the first tank through which the combustion face of the first propellant charge is exposed, and the second end of the second tank through which the combustion face of the second propellant charge is exposed, are arranged at a distance apart from each other, respectively towards the rear and towards the front of the thruster body, in a manner that is substantially symmetrical relative to the center of gravity of the vehicle situated on the longitudinal axis of the thruster body.

4. A system according to claim 1, wherein the first solid propellant charge presents a combustion speed different from the combustion speed of the second solid propellant charge.

5. A system according to claim 1, wherein surfaces of the first and second solid propellant charges other than their surfaces corresponding to the combustion faces are covered in a layer of inhibitor material.

6. A system according claim 1, wherein the first solid propellant charge comprises a plurality of solid propellant segments, the solid propellant segments being separated from one another by layers of inhibitor material.

7. A system according to claim 1, wherein the second solid propellant charge comprises a plurality of solid propellant segments, the solid propellant segments being separated from one another by layers of inhibitor material.

8. A system according to claim 1, wherein the first tank is in communication with the first valve set via an extender.

9. An air or space vehicle including a system according to claim 1.

10. A missile having a terminal portion fitted with a system according to claim 1.

* * * * *